Patented Nov. 14, 1950

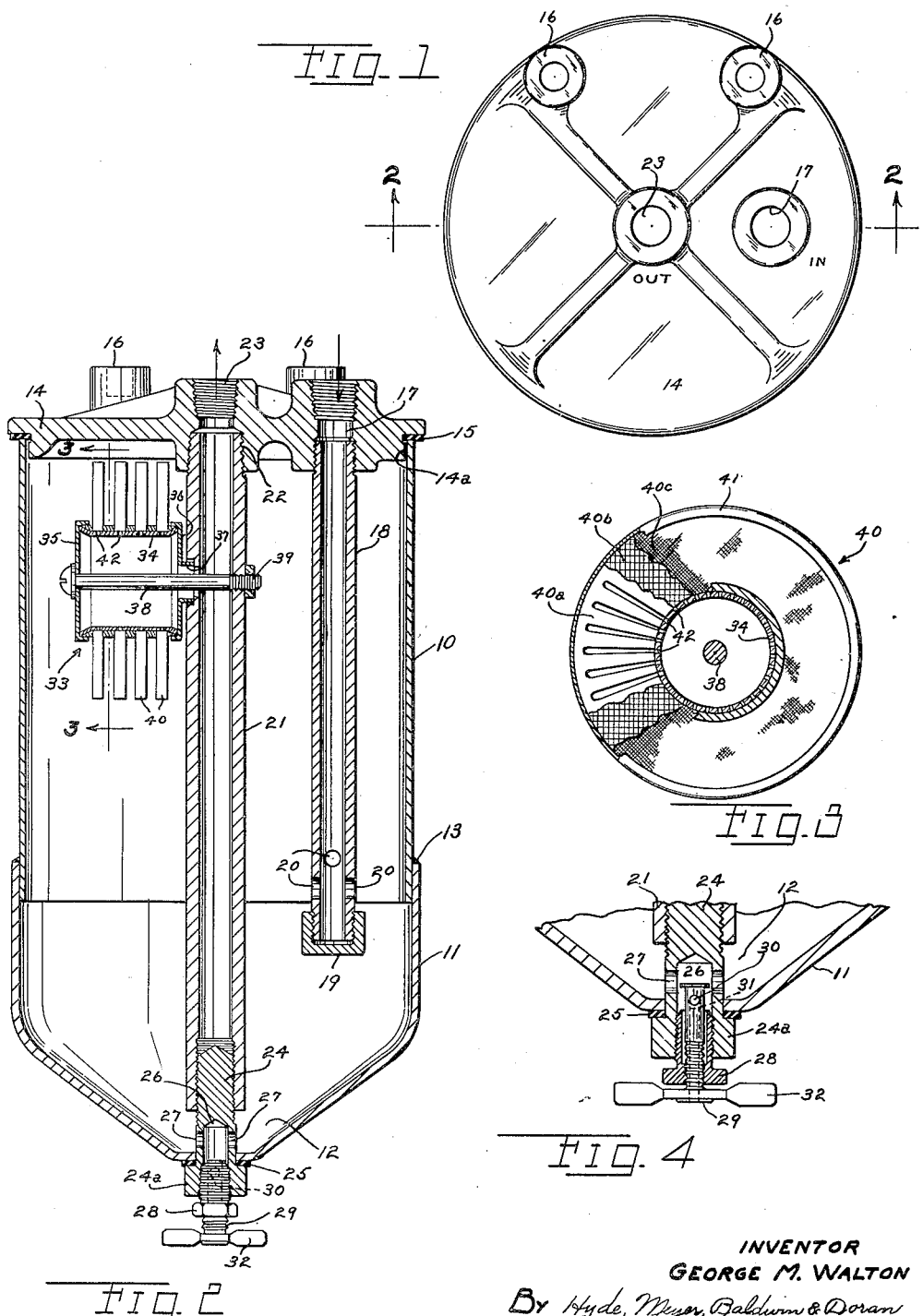

2,529,580

UNITED STATES PATENT OFFICE 2,529,580

LIQUID STRAINER

George M. Walton, Shaker Heights, Ohio, assignor to Air-Maze Corporation, Cleveland, Ohio, a corporation of Delaware Application January 15, 1948, Serial No. 2,492

2 Claims. (Cl. 210—187)

This invention relates to improvements in a liquid strainer and particularly a strainer of the type adapted to filter liquid fuel such as gasoline and the like.

An object of the present invention is to provide a large housing into which the incoming stream of unfiltered fuel is introduced in a manner to diffuse the same through the lower portion of the housing so as to permit water or entrained liquid to settle out. In the upper portion of the housing I provide a filter element adapted to filter out very small particles.

Another object of the present invention is to provide a novel and strong filter device comprising a tubular housing having a removable end closing member and a tube extending centrally of the housing strengthening the housing and holding the closing member in position.

Still another object of the present invention is to provide a filter element of the type described in the preceding paragraph wherein the central tube has a threaded connection with the removable end closing member and has a hollow stud bolt connection with the other end of the housing whereby a portion of the stud bolt may be made hollow to provide a novel drain means together with the advantages set forth in the preceding paragraph.

Still another object of the present invention is to provide in the filter construction previously mentioned a filter element comprising a foraminous shell with bolt means securing the shell to the central tube and a filter element surrounding the foraminous shell.

Still another object of the present invention is to provide in a device of the type described a filter element comprising a filtering surface of such a type that it will prevent the flow of water through the filter element where the water is entrained with the gasoline or other fuel being filtered.

Other objects and advantages of the present invention will be apparent from the accompanying drawings and descriptions and the essential features thereof will be set forth in the appended claims.

In the drawings,

Fig. 1 is a top plan view of the device of Fig. 2 embodying one form of my invention;

Fig. 2 is a central sectional view taken along the line 2—2 of Fig. 1;

Fig. 3 is an enlarged fragmental sectional view taken along the line 3—3 of Fig. 2, parts being broken away to more clearly show the construction, while Fig. 4 is an enlarged view of the lower portion of Fig. 2 illustrating another position of the parts.

While my device may take a number of forms, I have chosen to disclose an embodiment comprising a cylindrical tubular housing portion 10 closed at its lower end by a conical member 11 providing a sump at the point 12 to catch heavy entrained liquid or entrained particles. Preferably the member 11 is permanently secured to the member 10 by welding at the zone 13. The upper end of the housing is provided with an end closing member 14 which has a centering shoulder 14a which enters inside of the housing 10. A gasket 15 is held between the member 14 and the housing 10 to seal the joint there. Bosses are provided as indicated at 16 for securing the filter or strainer in position on an engine or the like.

Means is provided for introducing a stream of liquid to be filtered to the interior of the housing 10. The means here shown comprises an inlet passageway 17 through the top closing member 14. The tube 18 is threaded into the opening 17 and extends downwardly to a point near the bottom of the housing where it is closed with a cap 19. A plurality of openings 20 are provided near the lower end of the tube 18 to provide a diffusing action of the entering liquid in the housing. Preferably these openings 20 are directed in various orientations so as to diffuse the incoming liquid in all directions through the housing 10. Because the housing is of much greater diameter than the tube 18, the incoming liquid is slowed down to a great degree as it passes out of the openings 20 and this aids the deposition of solid material or entrained liquid into the sump 12.

A hollow tube 21 is threaded at 22 into the top cover 14 and communicates with a filtrate outlet 23 through the top cover. The lower end of the tube 21 has a threaded engagement with a stud bolt 24 which passes through the member 11, having a head 24a engaging the outer face of the member 11. A gasket 25 seals against leakage at this point. It should be obvious that when the bolt 24 is threaded into the lower end of the tube 21 it holds the cover 14 on the housing 10 in a very tight manner and at the same time secures the lower end of the tube 21 to the housing member 11. Thus the tube 21 provides not only an assembly member but at the same time strengthens the housing composed of the members 10 and 11 which may thus be made of a lighter gauge material than would otherwise be possible.

I may use the stud bolts 24 to provide means for draining the sump 12. To this end the lower end of the stud bolt is hollowed out as indicated at 26 and this hollow communicates through openings 27 with the sump 12. The lower end of the hollow member 26 is closed by means of a packing nut 28 threaded into the bolt head 24a. A plug valve member 29 is threaded inside the packing member 28 and provided at its inner end with one or more openings 30 which communicate through a passageway 31 with the atmosphere. A handle 32 is provided on the member 29. When this member is screwed inwardly as indicated in Fig. 4 the openings 30 communicate through the openings 27 with the sump 12 so that the material in the sump may flow out of the housing. When the member 29 is screwed outwardly as indicated in Fig. 2 the openings 30 are closed so that no flow can occur outwardly from the housing comprising the members 10 and 11.

Filtering means 33 is provided in the upper portion of the housing. As here shown this comprises a foraminous shell 34 having a cup shaped cap 35 closing one end and having a cap 36 partially closing the other end and providing an open neck 37 communicating with the interior of the tube 21. A bolt 38 passes through the cap 35 and through the neck 37 and is secured at 39 to the far side of the tube 21. The bolt 38 therefore serves to hold the shell 34 and the caps 35 and 36 in assembled relation while at the same time holding the filter element mounted on the tube 21.

A suitable filter element surrounds the shell 34. In the present instance this comprises a plurality of hollow filter leaves 40, one of which is more clearly shown in Fig. 3. These leaves are preferably of the same general type as disclosed and claimed in Patent No. 2,423,547, granted July 8, 1947, to Robert A. Behlen. In the form shown here a central separator member 40a takes the place of the coarse wire separator member of the Behlen patent. On opposite sides of this separator member are relatively coarse wire screens 40b, on top of which, forming the outer filtering face of each leaf is a layer 40c of fine calendered wire as disclosed in the Behlen patent and providing a plurality of filtering openings of the order of $3/1000$ of an inch in diameter. A grommet 41 closes the outer edge of each filtered leaf. The filtrate flows from each filtered leaf through openings 42 in shell 34.

In operation, the incoming liquid enters tube 18 and passes through the openings 20, diffusing in all directions through the lower portion of the housing. Solid material and entrained liquid, such as water in gasoline, for instance, will then separate out into the sump 12 and the liquid to be filtered passes to the upper portion of the housing, through the filter element 33, through the neck 37 and through the hollow tube 21, passing out the discharge 23.

Presumably water will be drained from the drain openings 27 by manipulation of the handle 32 as previously described in order to keep the water at a low level within the housing. If this is forgotten for a period of time, however, so that water rises to touch the filter leaves 40, nevertheless it will not pass through the leaves because the openings in the leaves are so small that water will not pass.

What I claim is:

1. A liquid strainer comprising a tubular housing having top and bottom end closing members, one of said members being removable, a tube extending longitudinally through the central portion of said housing, said tube being provided with open communication through one of said end closing members, means clamping said end closing members to said housing whereby to hold said removable member in end closing position, means for introducing a stream of liquid into the lower portion of said housing, a filter element in the upper portion of said housing having discharge communication with the interior of said tube, said filter element communication providing the sole communication between the said tube and said housing, said filter element comprising a foraminous shell having a closed end and having an open end communicating with said tube, a bolt secured to said closed end and passing through said open end and there secured to said tube, and a filter element outside of said shell and having filtrate communication therewith.

2. A liquid strainer comprising a tubular housing having top and bottom end closing members, one of said members being removable, a tube extending longitudinally through the central portion of said housing, said tube being provided with open communication through one of said end closing members, means clamping said end closing members to said housing whereby to hold said removable member in end closing position, means for introducing a stream of liquid into the lower portion of said housing, said means including a diffusing discharge end for spreading said liquid stream laterally, a filter element in the upper portion of said housing having discharge communication with the interior of said tube, said filter element communication providing the sole communication between the said tube and said housing, said filter element comprising a foraminous shell, a cup shape cap for closing one end of said shell, the other end of said shell having open communication with said tube, a bolt secured to said cap and passing through said other open end and there secured to said tube and holding said cap on said shell and holding said shell on said tube, and a filter outside of said shell and having filtrate communication therewith.

GEORGE M. WALTON.

REFERENCES CITED

The following references are of record in the file of this patent:

UNITED STATES PATENTS

| Number | Name | Date |
| --- | --- | --- |
| 995,402 | Davis | June 13, 1911 |
| 1,922,315 | Mooz | Aug. 15, 1933 |
| 2,188,643 | Laderer | Jan. 30, 1940 |
| 2,423,547 | Behlen | July 8, 1947 |

FOREIGN PATENTS

| Number | Country | Date |
| --- | --- | --- |
| 31,663 | France | Dec. 29, 1926 |
| | (1st addition to No. 595,495) | |
| 34,073 | France | Nov. 10, 1928 |
| | (1st addition to No. 592,183) | |